US012137217B2

(12) United States Patent
Lee et al.

(10) Patent No.: US 12,137,217 B2
(45) Date of Patent: *Nov. 5, 2024

(54) ADAPTIVE GOP STRUCTURE WITH FUTURE REFERENCE FRAME IN RANDOM ACCESS CONFIGURATION FOR VIDEO CODING

(71) Applicant: QUALCOMM Incorporated, San Diego, CA (US)

(72) Inventors: Sungwon Lee, Huntington Beach, CA (US); Wei-Jung Chien, San Diego, CA (US); Adarsh Krishnan Ramasubramonian, Irvine, CA (US); Muhammed Zeyd Coban, Carlsbad, CA (US); Jianle Chen, San Diego, CA (US); Yi-Wen Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,762

(22) Filed: Jun. 8, 2023

(65) Prior Publication Data

US 2023/0319269 A1 Oct. 5, 2023

Related U.S. Application Data

(63) Continuation of application No. 16/141,714, filed on Sep. 25, 2018, now Pat. No. 11,736,687.
(Continued)

(51) Int. Cl.
*H04N 19/114* (2014.01)
*H04N 19/107* (2014.01)
(Continued)

(52) U.S. Cl.
CPC ......... *H04N 19/114* (2014.11); *H04N 19/107* (2014.11); *H04N 19/159* (2014.11);
(Continued)

(58) Field of Classification Search
CPC .. H04N 19/114; H04N 19/107; H04N 19/159; H04N 19/187; H04N 19/31; H04N 19/70
See application file for complete search history.

(56) References Cited

U.S. PATENT DOCUMENTS 8,774,272 B1 7/2014 Chen
9,332,255 B2 5/2016 Ramasubramonian et al.
(Continued)

FOREIGN PATENT DOCUMENTS

CN 101146229 A 3/2008
CN 101188757 A 5/2008
(Continued)

OTHER PUBLICATIONS

Andersson K., et al., "Non-Normative JEM Encoder Improvements", Joint Video Exploration Team (JVET) of ITU-T SG 16 WP 3 and ISO/IEC JTC 1/SC 29/WG 11, 2nd Meeting: San Diego, USA, Feb. 20-26, 2016, JVET-B0039r1, 8 pages.
(Continued)

*Primary Examiner* — On S Mung
(74) *Attorney, Agent, or Firm* — Shumaker & Sieffert, P. A.

(57) ABSTRACT

A device for encoding video data includes a memory configured to store video data, and a video encoder implemented in circuitry and configured to encode a future picture of the video data having a first display order position, the future picture being included in an intra period (IP) of the video data, the IP comprising a plurality of groups of pictures (GOPs), and after encoding the future picture, encode a picture of an ordinal first GOP of the plurality of GOPs using
(Continued)

the future picture as a reference picture, each picture of the ordinal first GOP having display order positions earlier than the first display order position. Encoding the future picture in this manner may result in encoding performance improvements with minimal increases in encoding and decoding complexity.

22 Claims, 11 Drawing Sheets

Related U.S. Application Data

(60) Provisional application No. 62/563,526, filed on Sep. 26, 2017.

(51) Int. Cl.
　　*H04N 19/159*　　(2014.01)
　　*H04N 19/187*　　(2014.01)
　　*H04N 19/31*　　(2014.01)
　　*H04N 19/70*　　(2014.01)

(52) U.S. Cl.
　　CPC .......... *H04N 19/187* (2014.11); *H04N 19/31* (2014.11); *H04N 19/70* (2014.11)

(56) References Cited

U.S. PATENT DOCUMENTS

| | | | |
|---|---|---|---|
| 9,628,820 | B2 | 4/2017 | Wang et al. |
| 2009/0304080 | A1 | 12/2009 | Francois et al. |
| 2011/0002397 | A1 | 1/2011 | Wang et al. |
| 2011/0235703 | A1 | 9/2011 | Abrozzi et al. |
| 2014/0036999 | A1 | 2/2014 | Ryu et al. |
| 2017/0272787 | A1* | 9/2017 | Yoon .................. H04N 21/2387 |
| 2019/0098301 | A1 | 3/2019 | Lee et al. |

FOREIGN PATENT DOCUMENTS

| | | |
|---|---|---|
| CN | 105872545 A | 8/2016 |
| WO | 2014004391 A1 | 1/2014 |
| WO | 2015077220 A1 | 5/2015 |
| WO | 2017053351 A1 | 3/2017 |

OTHER PUBLICATIONS

Bossen F., et al., "AHG Report: Software development and HM Software Technical Evaluation", Joint Collaborative Team on Video Coding (JCT-VC) of ITU-T SG16 WP3 and ISO/IEC JTC1/SC29/WG11, 12th Meeting: Geneva, CH, Jan. 14-23, 2013, JCTVC-L0003, 3 pages.
Bossen F., et al., "HM Software Manual," Joint Collaborative Team on Video coding (JCT-VC) of ITU-T SG16 WP3 and SO/IEC JTC 1/SC29/WG11, Document: JCTVC-Software-Manual, Aug. 7, 2017, pp. 1-31.
Bossen F., et al., "JEM Software Manual", Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Chen J., et al., "Algorithm Description of Joint Exploration Test Model 1", Joint Video Exploration Team (JVET) of ITU-T SG 16 WP 3 and ISO/IEC JTC 1/SC 29/WG 11, 1st Meeting: Geneva, CH, Oct. 19-21, 2015, No. H.266, JVET-A1001, Feb. 24, 2016 (Feb. 24, 2016), XP030150000, 27 Pages, URL: http://phenix.int-evry.fr/jvet/.
Chen J., et al., "Algorithm Description of Joint Exploration Test Model 7 (JEM7)", 119 . MPEG Meeting, 7. JVET Meeting, Jul. 13, 2017-Jul. 21, 2017, JVET-G1001-V1, Joint Video Exploration Team (JVET) of ITU-T SG 16 WP3 and ISO/ICE JTC 1/SC 29/WG 11, No. m41357, No. G1001_v1, JVET-G1001, 7th Meeting, Jul. 13, 2017-Jul. 21, 2017, Torino, IT, N17055, Aug. 19, 2017, XP030150980, XP030023716, 48 Pages.
Chen J., et al., "Algorithm Description of Joint Exploration Test Model 4 (JEM4)", 116. MPEG Meeting, Oct. 17, 2016-Oct. 21, 2016, Chengdu, CN (Motion Picture Expert Group or ISO/IEC JTC1/SC29/WG11), JVET-D1001_v3, No. N16511, Nov. 21, 2016 (Nov. 21, 2016), 39 Pages, XP030023183, pp. 28-32.
"High Efficiency Video Coding (HEVC) Test Model 16 (HM 16) Encoder Description Update 8", 118th MPEG Meeting; Apr. 3, 2017-Apr. 7, 2017; Hobart; (Motion Picture Expert Group or ISO/IEC JTC1/SC29/WG11),, No. N16879, Jul. 16, 2017, XP030023543, 70 pages.
International Preliminary Report on Patentability—PCT/US2018/052876, The International Bureau of WIPO—Geneva, Switzerland, Apr. 9, 2020.
International Search Report and Written Opinion—PCT/US2018/052876—ISA/EPO—Dec. 4, 2018, 17 pages.
ITU-T H.223, "Series H: Audiovisual and Multimedia Systems, Infrastructure of Audiovisual Services—Transmission Multiplexing and Synchronization, Multiplexing Protocol for Low Bit Rate Multimedia Communication", The International Telecommunication Union, Jul. 2001, 74 Pages.
ITU-T H.265, "Series H: Audiovisual and Multimedia Systems, Infrastructure of Audiovisual Services—Coding of moving video : High efficiency video coding", The International Telecommunication Union, Apr. 2013, 317 pp.
Schwarz H., et al., "Hierarchical B Pictures", 16th JVT Meeting, 73. MPEG Meeting, Jul. 24, 2005-Jul. 29, 2005, Poznan, PL, (Joint Video Team of ISO/IEC JTC1/SC29/WG11 and ITU-T SG.16), No. JVT-P014, Jul. 19, 2005, XP030006056, 25 Pages, Jul. 29, 2005
Sjoberg R., et al., "Overview of HEVC High-Level Syntax and Reference Picture Management", IEEE Transactions on Circuits and Systems for Video Technology, vol. 22, No. 12, XP011487804, Dec. 2012, pp. 1858-1870.
Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, XP011487803, pp. 1649-1668.

\* cited by examiner

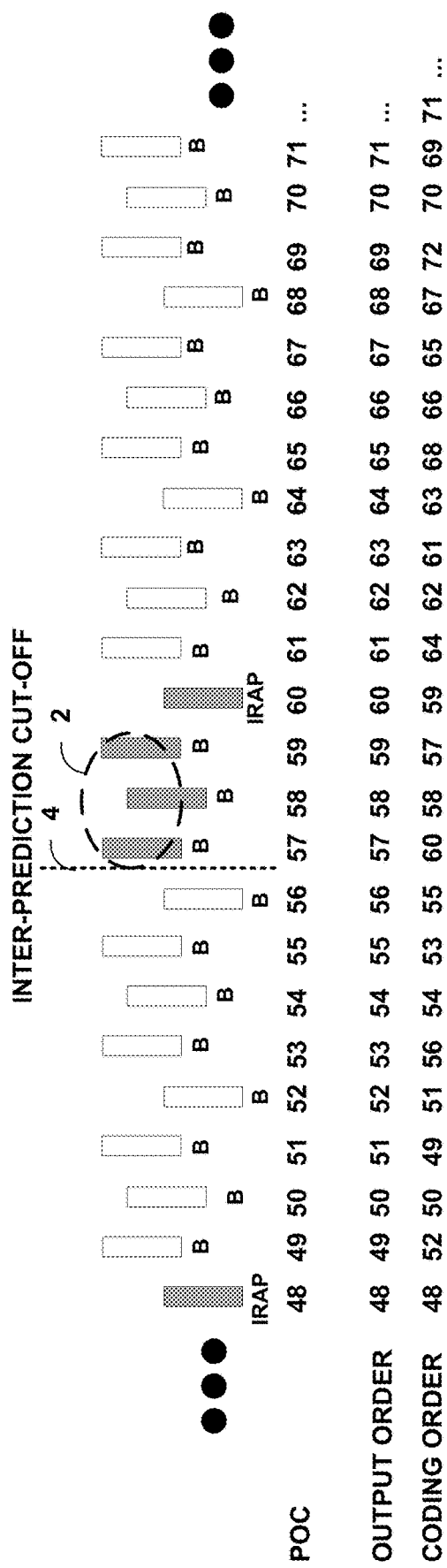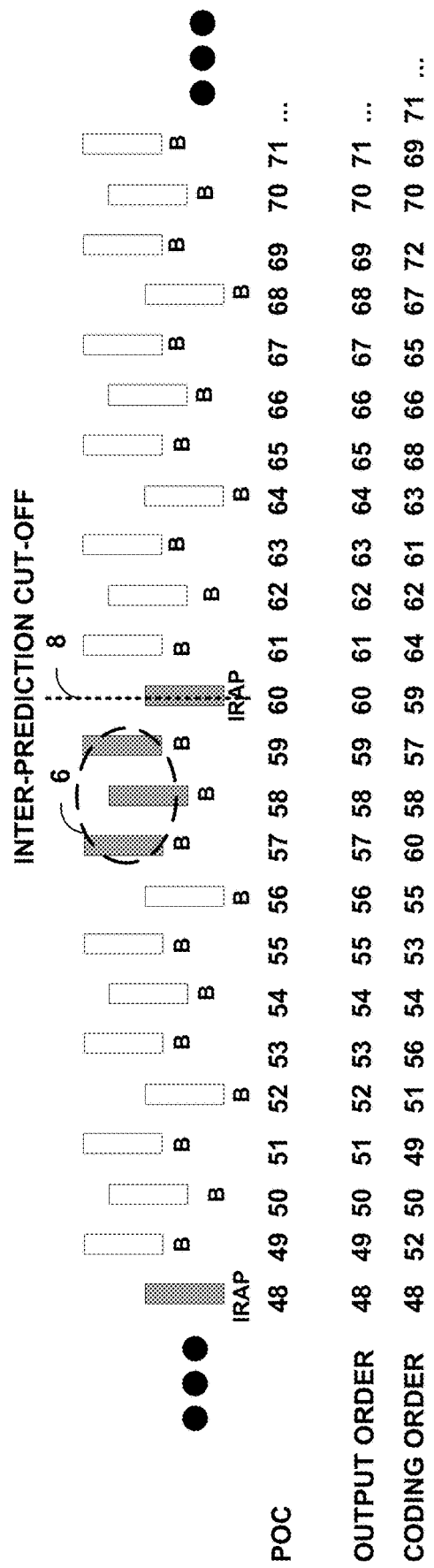
FIG. 1A
FIG. 1B

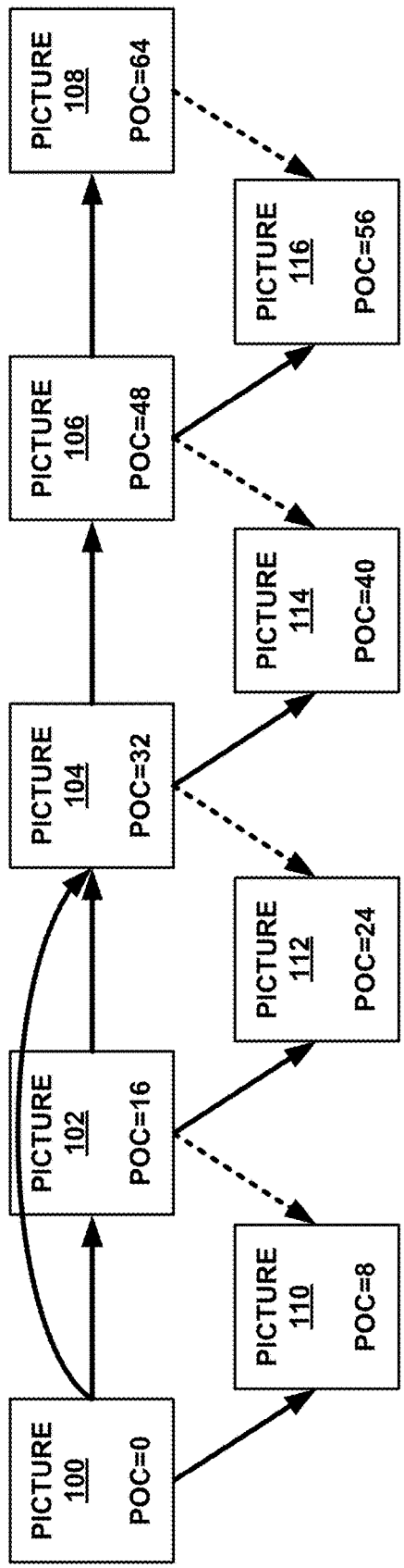
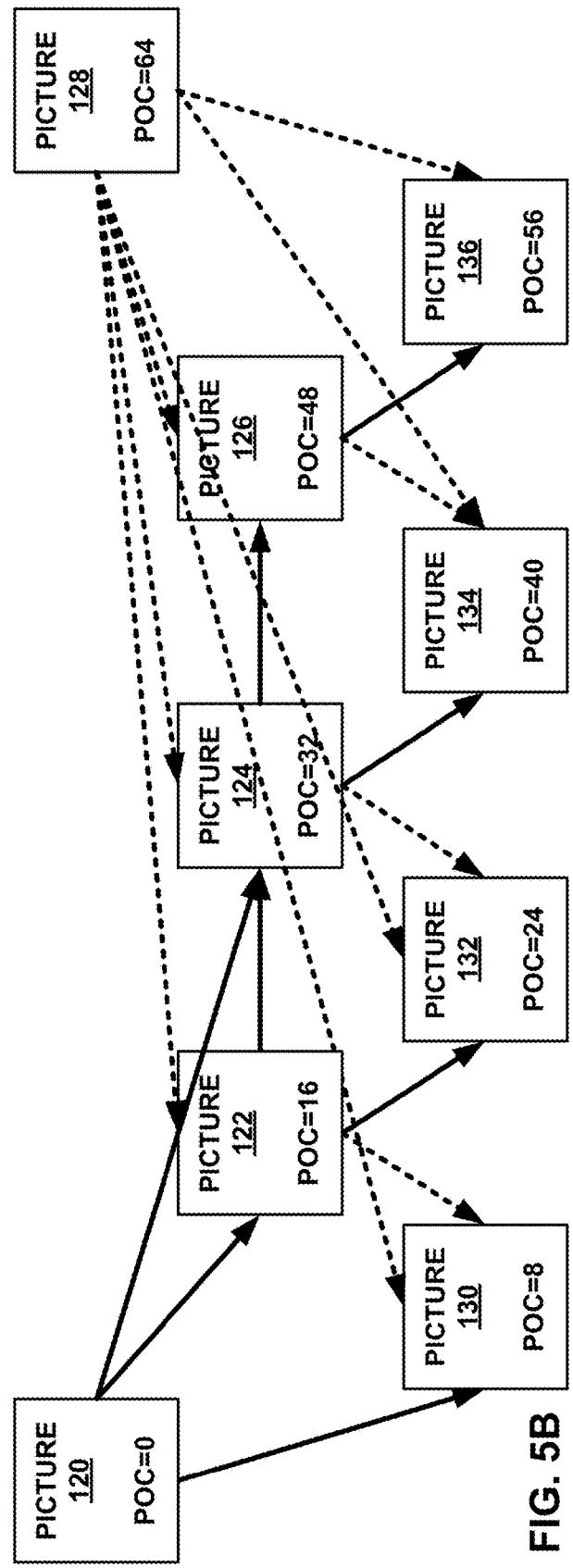
FIG. 5A
FIG. 5B

ADAPTIVE GOP STRUCTURE WITH FUTURE REFERENCE FRAME IN RANDOM ACCESS CONFIGURATION FOR VIDEO CODING

This application is a continuation of U.S. application Ser. No. 16/141,714, filed Sep. 25, 2018, which claims the benefit of U.S. Provisional Application No. 62/563,526, filed Sep. 26, 2017, the entire content of each of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by ITU-T H.261, ISO/IEC MPEG-1 Visual, ITU-T H.262 or ISO/IEC MPEG-2 Visual, MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards, such as Scalable Video Coding (SVC) and Multiview Video Coding (MVC) extensions. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to a group-of-pictures (GOP) structure and reference picture construction in a random access configuration that determines coding (encoding and/or decoding) order, reference picture lists, and picture buffer requirements in the context of advanced video codecs, such as the Joint Exploration Model (JEM) for an upcoming video codec. More specifically, the proposed techniques of this disclosure may improve the performance of inter-layer prediction by adopting more efficient coding orders and reference picture lists.

In one example, a method of encoding video data includes encoding a future picture of video data having a first display order position, the future picture being included in an intra period (IP) of the video data, the IP comprising a plurality of groups of pictures (GOPs), and after encoding the future picture, encoding a picture of an ordinal first GOP of the plurality of GOPs using the future picture as a reference picture, each picture of the ordinal first GOP having display order positions earlier than the first display order position.

In another example, a device for encoding video data includes a memory configured to store video data, and a video encoder implemented in circuitry and configured to encode a future picture of the video data having a first display order position, the future picture being included in an intra period (IP) of the video data, the IP comprising a plurality of groups of pictures (GOPs), and after encoding the future picture, encode a picture of an ordinal first GOP of the plurality of GOPs using the future picture as a reference picture, each picture of the ordinal first GOP having display order positions earlier than the first display order position.

In another example, a device for encoding video data includes means for encoding a future picture of video data having a first display order position, the future picture being included in an intra period (IP) of the video data, the IP comprising a plurality of groups of pictures (GOPs), and means for encoding, after encoding the future picture, a picture of an ordinal first GOP of the plurality of GOPs using the future picture as a reference picture, each picture of the ordinal first GOP having display order positions earlier than the first display order position.

In another example, a computer-readable storage medium has stored thereon instructions that, when executed, cause a processor of a device for encoding video data to encode a future picture of video data having a first display order position, the future picture being included in an intra period (IP) of the video data, the IP comprising a plurality of groups of pictures (GOPs), and after encoding the future picture, encode a picture of an ordinal first GOP of the plurality of GOPs using the future picture as a reference picture, each picture of the ordinal first GOP having display order positions earlier than the first display order position.

The details of one or more examples are set forth in the accompanying drawings and the description below. Other features, objects, and advantages will be apparent from the description and drawings, and from the claims.

BRIEF DESCRIPTION OF DRAWINGS

FIGS. 1A and 1B are conceptual diagrams illustrating inter prediction cut-offs for closed and open groups of pictures (GOPs), respectively.

FIGS. 5A and 5B are conceptual diagrams illustrating an example in which a single future intra prediction frame (I-frame) per each set of intra period (IP) pictures is coded before the first picture in the first GOP after a previous I-frame in coding order.

FIGS. 7A and 7B are conceptual diagrams illustrating an example coding of sixty-five pictures in accordance with an example of the techniques of this disclosure.

DETAILED DESCRIPTION

Figure 2:
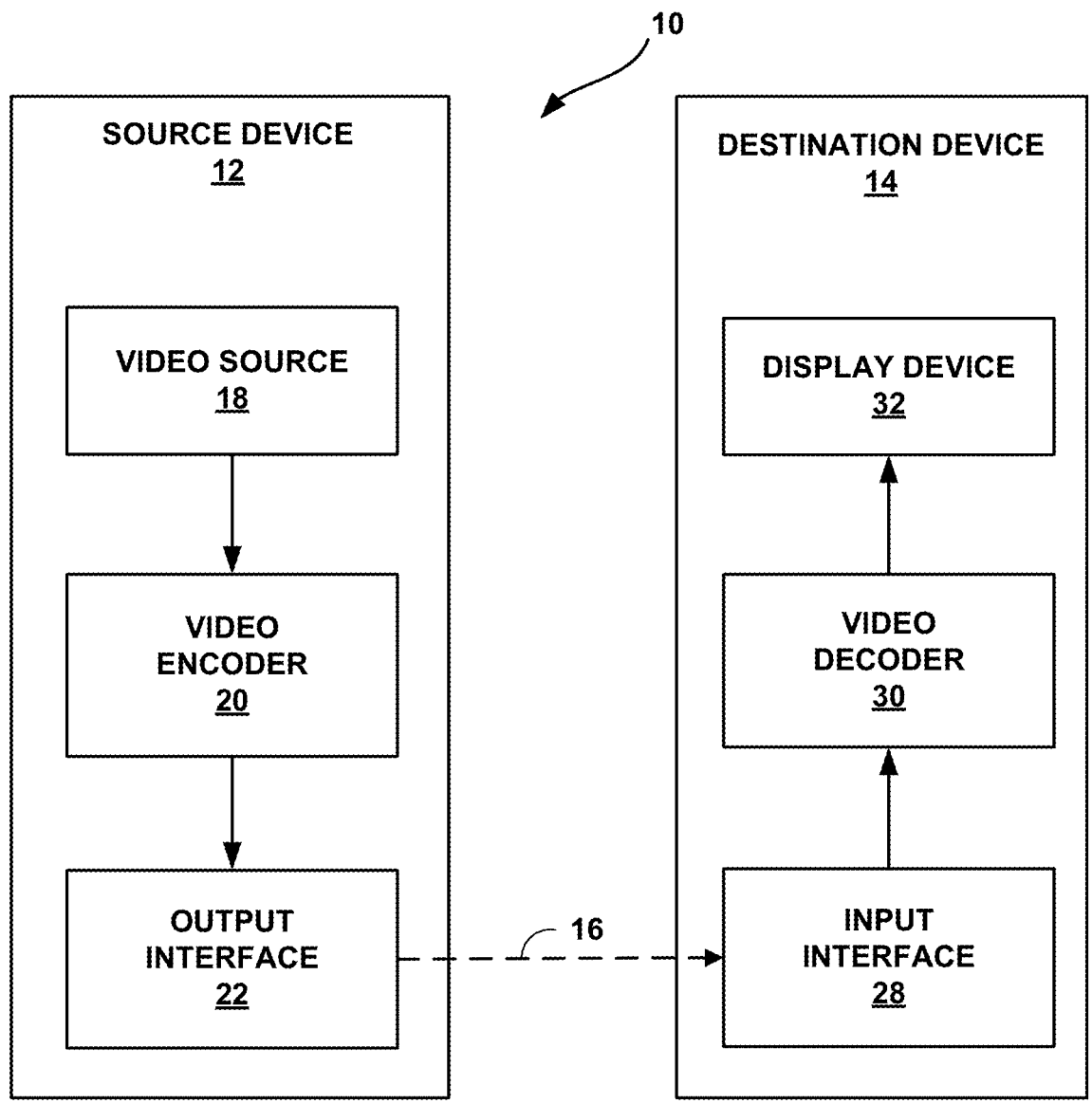
FIG. 2 is a block diagram illustrating an example video encoding and decoding system that may use the techniques for adaptive group of pictures (GOP) structures of this disclosure.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A joint draft of MVC is described in "Advanced video coding for generic audiovisual services," ITU-T H.264, March 2010, available from www.itu.int/rec/T-REC-H.264-201003-S/en. In addition, a recently developed video coding standard, namely High Efficiency Video Coding (HEVC), was developed by the Joint Collaboration Team on Video Coding (JCT-VC) of ITU-T Video Coding Experts Group (VCEG) and ISO/IEC Motion Picture Experts Group (MPEG). A recent draft of HEVC is available from phenix.int-evry.fr/jct/doc_end_user/documents/12_Geneva/wg11/JCTVC-L1003-v34.zip.

This disclosure recognizes that use of future frames as reference frames can increase coding efficiency with minimal changes to existing video codecs. For example, by coding one or more future frames at the start of an intra-period (IP) including multiple groups of pictures (GOPs), the future frames can be used as reference frames for subsequently coded pictures of the IP. Coding the pictures of the IP in this manner may increase coding efficiency (e.g., reduce the size of a bitstream) without increasing complexity of the video coding process.

FIGS. 1A and 1B are conceptual diagrams illustrating inter prediction cut-offs for closed and open groups of pictures (GOPs), respectively. Random access in HEVC is enabled by using intra random access point (IRAP) pictures, including instantaneous decoding refresh (IDR) pictures, clean random access (CRA) pictures and broken link access (BLA) pictures. IDR pictures follow a closed group of picture (GOP) structure, while CRA pictures follow an open GOP structure. That is, in general, a closed GOP includes pictures that do not include inter-prediction references to pictures preceding the GOP in decoding order, whereas an open GOP may include inter-prediction references to pictures preceding the GOP in decoding order. BLA pictures usually result from splicing bitstreams at CRA picture locations.

FIGS. 1A and 1B illustrate the different IRAP pictures in closed GOP and open GOP structures. FIGS. 1A and 1B indicate both the output order and decoding order of each picture shown. In particular, the display and decoding orders are stated for the POC values of the picture. That is, the decoding order of the pictures is shown with reference to the POC values of the pictures from left to right, meaning that a first POC value in the decoding order row to the left of a second POC value in the decoding order row indicates that the picture with the first POC value will be decoded before the picture with the second POC value. For example, the picture with picture order count (POC) value (which can be thought as a unique number assigned for identifying each picture in the bitstream) 52 follows the picture with POC value 51 in output order. This means that the picture with POC 51 shall be outputted earlier than the picture with POC value 52. Likewise, the picture with POC value 52 precedes the picture with POC value 50 in decoding order, meaning that the picture with POC value 52 shall be decoded earlier than the picture with POC value 50.

Generally, a video coder may use pictures that are decoded earlier than a current picture for inter-prediction reference when coding (encoding or decoding) the current picture. For random access, to enable a start of the decoding process from an IRAP picture, there is an inter prediction cut-off, such that pictures after the cut-off point cannot be inter-predicted from any previously decoded picture prior to the inter prediction cut-off in decoding order. FIG. 1A illustrates inter prediction cut-off point 4, while FIG. 1B illustrates inter prediction cut-off point 8. FIG. 1A also illustrates leading pictures 2, while FIG. 1B illustrates leading pictures 6.

FIG. 1A illustrates an example of a closed GOP structure, including an example inter prediction cut-off point 4. Pictures that are on the right side of inter prediction cut-off point 4 (i.e., following inter prediction cut-off point 4) cannot be inter predicted from pictures on the left side of inter prediction cut-off point 4. As shown in FIG. 1A, there is a set of pictures (leading pictures 2) that follows the IRAP picture having POC value 60 in decoding order but are output earlier than the IRAP picture having POC value 60. Thus, the pictures with POC values 57, 58 and 59 in FIG. 1A are referred to as leading pictures. In a closed GOP structure, e.g., per FIG. 1A, leading pictures associated with an IRAP picture cannot be predicted from reference pictures that precede the IRAP having POC value 60 both in decoding and output order (i.e., the pictures to the left of inter-prediction cut-off point 4, which are the pictures with POC value 56 or less in FIG. 1A). However, leading pictures 2 may be used as reference for inter prediction of pictures that follow the IRAP picture with POC value 60, both in decoding and output order (i.e., the pictures with POC value 61 or greater, which are also referred to as the trailing pictures of the IRAP picture with POC value 60).

FIG. 1B illustrates an example of an open GOP structure, including an inter prediction cut-off point 8 that lies on the IRAP picture with POC value 60. Pictures that are on the left side of the IRAP picture with POC value 60 and that follow the IRAP picture with POC value 60 in decoding order (i.e., leading pictures 6) can still be inter-predicted using the IRAP picture with POC 60 for reference. Pictures to the right side of the IRAP picture with POC value 60 can also be inter-predicted using the IRAP picture with POC value 60 for reference, but not using pictures to the left side of the IRAP picture with POC value 60 (and inter prediction cut-off point 8) as reference for inter prediction. Thus, leading pictures 2, 6 portray the difference between closed and open GOPs. In the open GOP case, the leading pictures can refer to (i.e., use as reference for inter-prediction) pictures that are earlier in decoding order than their associated IRAP picture, but this is not allowed in the closed GOP case. This difference allows the leading pictures in the open GOP case to be coded more efficiently than in the closed GOP case. In both the open GOP and closed GOP cases, the leading pictures cannot be used as reference for inter prediction of the trailing pictures (i.e., the pictures that follow the TRAP both in decoding and output order).

In Common Test Condition (CTC) of JEM 4.0 for the next generation of video codec, the open GOP structure is enabled by default by adopting CRA for the picture at the intra period (IP), also sometimes referred to as an intra frame period. In general, an intra period is a set of pictures including multiple groups of pictures (GOPs), where each of the GOPs may have a common size, and the intra period has a multiple of the size of the GOPs. For example, the GOPs may have a size of 16 pictures, and an IP may be a collection of four GOPs, such that the IP has 64 pictures. Additional details about features of different picture types, such as IDR and CRA, are discussed in G. J. Sullivan, J.-R. Ohm, W.-J. Han, T. Wiegand, "Overview of the high efficiency video coding (HEVC) standard", IEEE Trans. Circuits Syst. Video Technol., vol. 22, pp. 1648-1667, December 2012, and ITU-T H.265 (April 2013).

A reference picture set (RPS) is a set of previously decoded pictures that may be used for inter prediction to decode following pictures in decoding order. In RPS, POC value is used to identify each picture. Once a picture is decoded, the picture is stored in a decoded picture buffer (DPB) (e.g., of a computer-readable storage medium, such as a memory). Pictures in the DPB may be used as reference pictures for decoding future pictures, and/or may be displayed without being used as a reference picture. If a picture in the DPB is not specified in an RPS, it is marked as unused for reference and can be deleted from the DPB after being displayed. Note that the RPS and reference picture lists are different in the HEVC specification. HEVC specifies that reference picture lists contain a certain number of pictures to be used as reference for inter prediction of a current picture, while the RPS describes all of the pictures that should be kept for both current and future pictures. Additional details about RPS and the construction of reference picture list are discussed in ITU-T H.265 (April 2013).

According to HEVC, RPS signaling is specified in a sequence parameter set (SPS) using one of two possible coding modes: explicit coding mode or differential coding mode, which supports up to $N_{RPS,max}=64$ RPSs. If the RPSs do not change over a whole sequence, an index, $i_{RPS}=0$, ($N_{RPS}-1$), specified in slice headers, is enough to indicate which RPS is to be applied to the current slice. However, if there exists an extra RPS that is not included in the RPSs signaled via the SPS, the extra RPS is signaled in a slice header using either explicit or differential coding mode with the index $i_{RPS}=N_{RPS}$. Each slice header in the picture should refer to the same RPS, because the RPS is constructed only once per picture. JEM 4.0 software uses the same signaling method as HEVC, as discussed above.

To maximize the coding efficiency in random access configuration, optimized quantization parameter (QP) values, lambda in RD optimization, GOP size, and reference structure for inter prediction may be used. This disclosure recognizes, however, that in practice, an optimal set of those parameters to achieve significant improvement of coding efficiency is difficult to be exploited without additional encoder complexity or memory requirements.

For example, as proposed in K. Andersson, P. Wennersten, R. Sjoberg, J. Samuelsson, J. Strom, P. Hermansson, M. Pettersson, "Non-normative JEM encoder improvements", JVET-B0039, February 2016 (hereinafter, "Andersson"), the change of QP value and lambda leads to a good trade-off between bit consumption and reconstruction quality, which brings BD-rate gain if they are well aligned. Also, the increase of GOP size, e.g. from GOP 8 to GOP 16 as in Andersson, increases coding performance by requiring one extra picture buffer in both encoder and decoder. The above-mentioned changes were adopted to Common Test Condition (CTC) in JEM 4.0.

A further gain can be achieved by increasing GOP size, e.g., GOP 32 or GOP 64. However, the further increase of GOP size may be limited for three reasons. First, GOP 32 or GOP 64 may require the buffer size to be increased by 1 or 2 over GOP 16, respectively, both on encoder and decoder. This can pose a hurdle, especially when higher resolution sequences, e.g., 4K or 8K sequences, are being coded. Second, larger GOP size limits the number of applicable intra periods, because intra periods should be multiples of GOP size, as specified in G. J. Sullivan, J.-R. Ohm, W.-J. Han, T. Wiegand, "Overview of the high efficiency video coding (HEVC) standard", IEEE Trans. Circuits Syst. Video Technol., vol. 22, pp. 1648-1667, December 2012. For example, if GOP size is 64, intra periods of 32 or 48 cannot be applied. Third, a fixed GOP structure with a larger GOP size is difficult to adapt to various characteristics of target video sequences. For example, if GOP 64 is applied to a video sequence with fast motion, the accuracy of inter prediction may significantly decrease, compared to that of smaller GOP sizes, e.g., GOP 16, due to larger POC distance between current picture and reference pictures.

This disclosure describes techniques that may be used to improve coding efficiency with minimal changes on existing video codecs, e.g., HEVC or advanced video codecs such as JEM. The proposed techniques are similar to conventional GOP structure, e.g., GOP 8 or GOP 16, but does not limit the number of applicable intra periods, while providing a significant coding gain with minimal increase of picture buffer size. In addition, with the techniques of this disclosure, an adaptive reference structure can be achieved with any given GOP size. To implement the proposed techniques on existing codes such as HEVC or JEM, for example, the conventional RPS signalling can be used without any decoder change. In other examples, the proposed techniques can be implemented with new signalling methods, achieving better coding efficiency but may include changes, both on the encoder and the decoder. The techniques of this disclosure may result in a particular ordering of coded pictures in a bitstream received at a decoder, i.e., the order of POC values in the coded bitstream.

FIG. 2 is a block diagram illustrating an example video encoding and decoding system 10 that may use the techniques for adaptive group of pictures (GOP) structures of this disclosure. As shown in FIG. 2, system 10 includes a source device 12 that provides encoded video data to be decoded at a later time by a destination device 14. In particular, source device 12 provides the video data to destination device 14 via a computer-readable medium 16. Source device 12 and destination device 14 may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may include any type of medium or device capable of moving the encoded video data from source device 12 to destination device 14. In one example, computer-readable medium 16 may include a communication medium to enable source device 12 to transmit encoded video data directly to destination device 14 in real-time. The encoded video data may be modulated according to a communication standard, such as a wireless communication protocol, and transmitted to destination device 14. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 2, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for adaptive GOP structures with future reference frames in random access configurations. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 2 is merely one example. Techniques for adaptive GOP structures with future reference frames in random access configurations may be performed by any digital video encoding and/or decoding device. The techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 includes video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may include any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. Moreover, video encoder 20 and video decoder 30 may operate according to JEM or Versatile Video Coding (VVC). The techniques of this disclosure, however, are not limited to any particular coding standard. Other examples of video coding standards include MPEG-2 and ITU-T H.263. Although not shown in FIG. 2, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, such as ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, includes a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs (or partitions of a CU) within a given CU defined for a partitioned CTU, although this may not always be the case. The TUs are typically the same size or smaller than the PUs (or partitions of a CU, e.g., in the case of intra prediction). In some examples, residual samples corresponding to a CU may be subdivided into smaller units using a quadtree structure known as a "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs) when predicted using inter-prediction. In general, a PU represents a spatial area corresponding to all or a portion of the corresponding CU, and may include data for retrieving and/or generating a reference sample for the PU. Moreover, a PU includes data related to prediction. When the CU is inter-mode encoded, one or more PUs of the CU may include data defining motion information, such as one or more motion vectors, or the PUs may be skip mode coded. Data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

Leaf-CUs may also be intra-mode predicted. In general, intra prediction involves predicting a leaf-CU (or partitions thereof) using an intra-mode. A video coder may select a set of neighboring, previously coded pixels to the leaf-CU to use to predict the leaf-CU (or partitions thereof).

A leaf-CU may also include one or more transform units (TUs). The transform units may be specified using an RQT (also referred to as a TU quadtree structure), as discussed above. For example, a split flag may indicate whether a leaf-CU is split into four transform units. Then, each TU may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, partitions of a CU, or the CU itself, may be collocated with a corresponding leaf-TU for the CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random access point (RAP) picture. A video sequence may include syntax data in a sequence parameter set (SPS) that characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may include N×M pixels, where M is not necessarily equal to N.

Following intra-predictive or inter-predictive coding using the PUs of a CU, video encoder 20 may calculate residual data for the TUs of the CU. The PUs may include syntax data describing a method or mode of generating predictive pixel data in the spatial domain (also referred to as the pixel domain) and the TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an rn-bit value during quantization, where n is greater than rn.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

With any given intra period (IP) and GOP size in a random access configuration, a conventional GOP structure keeps using the same coding order and reference pictures for every GOP through sequence. However, in accordance with the techniques of this disclosure, video encoder 20 and/or video decoder 30 may code a certain number of future (early coded) pictures of intra period (IP) pictures, e.g., 64 pictures in the case of IP=64, between two adjacent IRAP pictures earlier than other pictures. The future (early coded) pictures can be beyond the given GOP boundary in display order, but should be before the next IRAP picture in display order. And video encoder 20 and/or video decoder 30 code the remaining pictures following a fixed order for every GOP except for the future (early coded) picture(s). The modified coding order for the pictures between two adjacent IRAP pictures are repeated throughout the sequence; the relative POC values of the NF future (early coded) picture(s) with respect to adjacent IRAP pictures does not change throughout the input sequence.

Video encoder 20 and/or video decoder 30 store the early coded pictures in a memory including a picture buffer and can use these early coded pictures as one of a plurality of reference pictures for following pictures in the coding order. The increase of buffer size required to store the early coded pictures depends on the number of early coded pictures and its (their) POC value(s). The modified coding order may be matched in both video encoder 20 and video decoder 30 to avoid any mismatch. Denote the number of future (early coded) pictures NF, where NF can be 0, 1, . . . , or IP. For the remaining pictures, any GOP size can be used as long as the value of IP is a multiple of GOP size.

In one example, video encoder 20 and/or video decoder 30 code a single future picture (e.g., an I-frame) in every IP picture, e.g., 64 pictures for IP=64, before coding the first picture in the first GOP after a previous I-frame in the coding order. FIGS. 5A and 5B below illustrate examples in which a single future I-frame per each set of IP pictures is coded before the first picture in the first GOP after a previous I-frame in coding order.

In one example, video encoder 20 and/or video decoder 30 code data representing availability of the future (early coded) picture. This data may use conventional RPS signalling either by adopting explicit or differential coding that are specified in HEVC standard, as also adopted in JEM. First, video encoder 20 and/or video decoder 30 may code data of an SPS that indicates the given GOP size and its reference structure that includes the future (early coded) picture. Second, in a picture that requires the update of delta POC value referring to the future (early coded) picture, video encoder 20 and/or video decoder 30 may code data representing the updated RPS in a slice header using either explicit or differential coding. Thus, this approach does not require any change in HEVC or JEM decoder.

In one example, video encoder 20 and video decoder 30 may code data indicating availability of the future picture using only the conventional RPS signalling in SPS, without using RPS signalling in the slice header. Instead, video encoder 20 and video decoder 30 may code data of two entries added to the SPS relative to HEVC/JEM: a flag to indicate if the proposed scheme is enabled or not and an intra period if the flag is on. Since the future (early coded) picture is always the next I-frame, video decoder 30 can detect if the current picture is the future picture or not, based on the picture's POC value and the value of intra period. Then, video decoder 30 may modify the RPS if necessary, based on a fixed rule of RPS construction, e.g., as specified in HEVC. Thus, this approach may include normative changes in both video encoder 20 and video decoder 30, relative to HEVC.

In one example, video encoder 20 and video decoder 30 may code a set of deltaPOC values of a list of potential future coded pictures, such that the deltaPOC values are coded with respect to the first reference picture. Video encoder 20 and video decoder 30 may code the signaling data in the SPS, or other parameter set (e.g., a video parameter set (VPS), picture parameter set (PPS), or adaptation parameter set (APS)). Instead of the first reference picture, any of a previous IRAP picture in decoding order, an IRAP picture in the RPS, or an IRAP picture with a smallest POC value in the RPS may be used. Alternatively, video encoder 20 and video decoder 30 may code multiple sets of deltaPOC values of lists of potential future coded pictures as templates to be selected.

In one example, video encoder 20 and video decoder 30 may code data indicating a subset of future coded pictures for each given intra period. The data may indicate the number of future coded pictures, NF, from the set of future coded pictures as discussed above; this number would indicate the first NF pictures in the list of potential coded pictures. The data may indicate explicitly a set of potential future coded pictures that are coded in an intra period. Video encoder 20 and/or video decoder 30 may then code an index into the list of sets indicating a selection from one of the subsets of deltaPOC values/list of future coded pictures in the SPS.

In one example, video encoder 20 and video decoder 30 may code data that signals a position of a subset of future coded pictures. This indication may be included in an SPS and apply to all intra periods. Additionally or alternatively, video encoder 20 and/or video decoder 30 may code data at the slice level that indicates the subset of future coded pictures.

In one example, video encoder 20 and video decoder 30 may be configured to derive the RPS of a current picture based on the existing RPS derivation process of HEVC and the subset of future coded pictures indicated in the bitstream. In particular, video encoder 20 and video decoder 30 may be configured to add one or more future coded pictures in to the RPS based on the subset of future coded pictures applicable to the current intra period and when the future coded picture in the intra period is decoded and/or keep track of when a future coded picture would have been removed in the existing RPS derivation process.

In addition or the alternative, video encoder 20 and video decoder 30 may be configured to code (encode or decode, respectively) a single future frame (not necessarily an I-frame) in every intra period (IP) pictures, e.g., 64 pictures for IP=64, then code the remaining pictures by following a fixed order for any given GOP size. The relative position of the future (early coded) picture with respect to adjacent TRAP pictures may be fixed throughout the sequence. For example, for IP=64, the future frame can be the picture located in the middle of two consecutive I-frames, i.e., POC 32+IP*i, where i=0, 1, 2, . . . . Thus, the coding order will be POC 0→POC 32→POC 16→POC 8→ . . . → POC 24→ . . . →POC 48→POC 40→ . . . →POC 64→POC 56– . . . →POC 63. The coded frame, e.g., POC 32, is stored in a memory including a buffer of video encoder 20 or video decoder 30 to make the coded frame available as one of a plurality of potential reference pictures for following pictures.

In some examples, video decoder 30 need not change to support this coding scheme by using conventional RPS signaling as discussed above. That is, video encoder 20 may signal availability of the future (early coded) picture to video decoder 30 using conventional RPS signaling using explicit or differential coding as specified in HEVC and JEM.

In one example, a further improvement in coding efficiency can be achieved by video encoder 20 and video decoder 30 being configured to code additional information (e.g., deltaPOC with respect to a given intra period) on top of the techniques described above regarding conventional RPS signaling in the SPS but not using RPS signaling in the slice header. In the example described above, the deltaPOC value is 32. Since the relative position of the future (early coded) picture with respect to TRAP picture does not change, one single value of deltaPOC will be enough for video decoder 30 to detect which POC should be considered as the future frame, and video decoder 30 may generate a modified RPS accordingly based on a fixed rule for RPS construction.

In one example, video encoder 20 and video decoder 30 may code multiple frames in every IP pictures (e.g., where the "IP pictures" is 64 pictures for IP=64), then code the remaining pictures by following a fixed order for any given GOP size. The future (early coded) pictures may or may not include future I-frames, depending on the needs of application. For example, in the case of IP=64 and GOP 16, a depth first search (DFS)-like coding order can be employed. With four future (early coded) pictures, the coding order may be POC 0→POC 64→POC 16→POC 32→POC 48→ POC 8→ . . . →POC 24→ . . . →POC 40 . . . → POC 56→ . . . →POC 63. Here, the relative positions of the future (early coded) picture with respect to the location of two adjacent TRAP pictures are fixed throughout the sequence. In the above example, the four future frames have POC values of $POC_1=16+IP*i$, $POC_2=32+IP*i$, $POC_3=48+IP*i$, $POC_4=64+IP*i$, where i=0, 1, 2, . . . . Note that the required buffer size increase as the number of future frames increases.

In some examples, video decoder 30 need not change to support this coding scheme by using conventional RPS signaling as discussed above. That is, video encoder 20 may signal availability of the future (early coded) picture to video decoder 30 using conventional RPS signaling using explicit or differential coding as specified in HEVC and JEM. Alternatively, this signaling data may include multiple elements of deltaPOC, as discussed above.

Additionally or alternatively, with any given GOP size and intra period (IP), e.g., GOP16 and IP=64, in random access configuration, video encoder 20 and/or video decoder 30 may employ an adaptive choice of a single or multiple future (early coded) pictures. That is, the POC value(s) of the future (early coded) picture(s) are not necessarily fixed in every IP picture; the relative POC values with respect to adjacent IRAP pictures can change, in some examples. Video encoder 20 and video decoder 30 may determine the number of future pictures (NF) and POC values of them before coding the first picture in every IP pictures.

The number and choice of the future (early coded) picture(s) may be determined (by video encoder 20 and/or by a user or administrator) by a training procedure for (an) input video sequence(s). Additionally or alternatively, the number and choice of the future (early coded) picture(s) may be determined (by video encoder 20 and/or by a user or administrator) using characteristics of (an) input video sequence(s). The pictures in the first or a certain number of GOP(s) may be coded in a conventional way (e.g., per HEVC). During the period, video encoder 20 may collect statistics to measure the dynamics of input video sequence by considering average size of motion vector, intra-prediction ratio, skip ratio, and/or similar characteristics. The more difficult the input video is to code, the more future (early coded) pictures are expected to be required with smaller POC distance among those pictures.

For signalling of availability of the future (early coded) picture to video decoder 30, more bits may be used than the techniques described above, because the relative POC values with respect to adjacent IRAP pictures can change. In some examples, video decoder 30 need not change to support this coding scheme by using conventional RPS signaling as discussed above. That is, video encoder 20 may signal availability of the future (early coded) picture to video decoder 30 using conventional RPS signaling using explicit or differential coding as specified in HEVC and JEM. Alternatively, two flags may be signaled: one flag in SPSs and another in slice headers. The entry to SPS may be a flag to indicate if the proposed scheme is enabled or not. Once the flag is on, video encoder 20 and video decoder 30 code another flag in slice header to indicate if the current picture is the future (early coded) picture or not. If not, video decoder 30 follows the reference structure in RPS already signalled via SPS. If the flag in slice header is on, video decoder 30 may construct a modified RPS accordingly, based on a fixed rule for RPS construction.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may include an integrated circuit, a microprocessor, and/or a wireless communication device, such as a cellular telephone.

Figure 3:
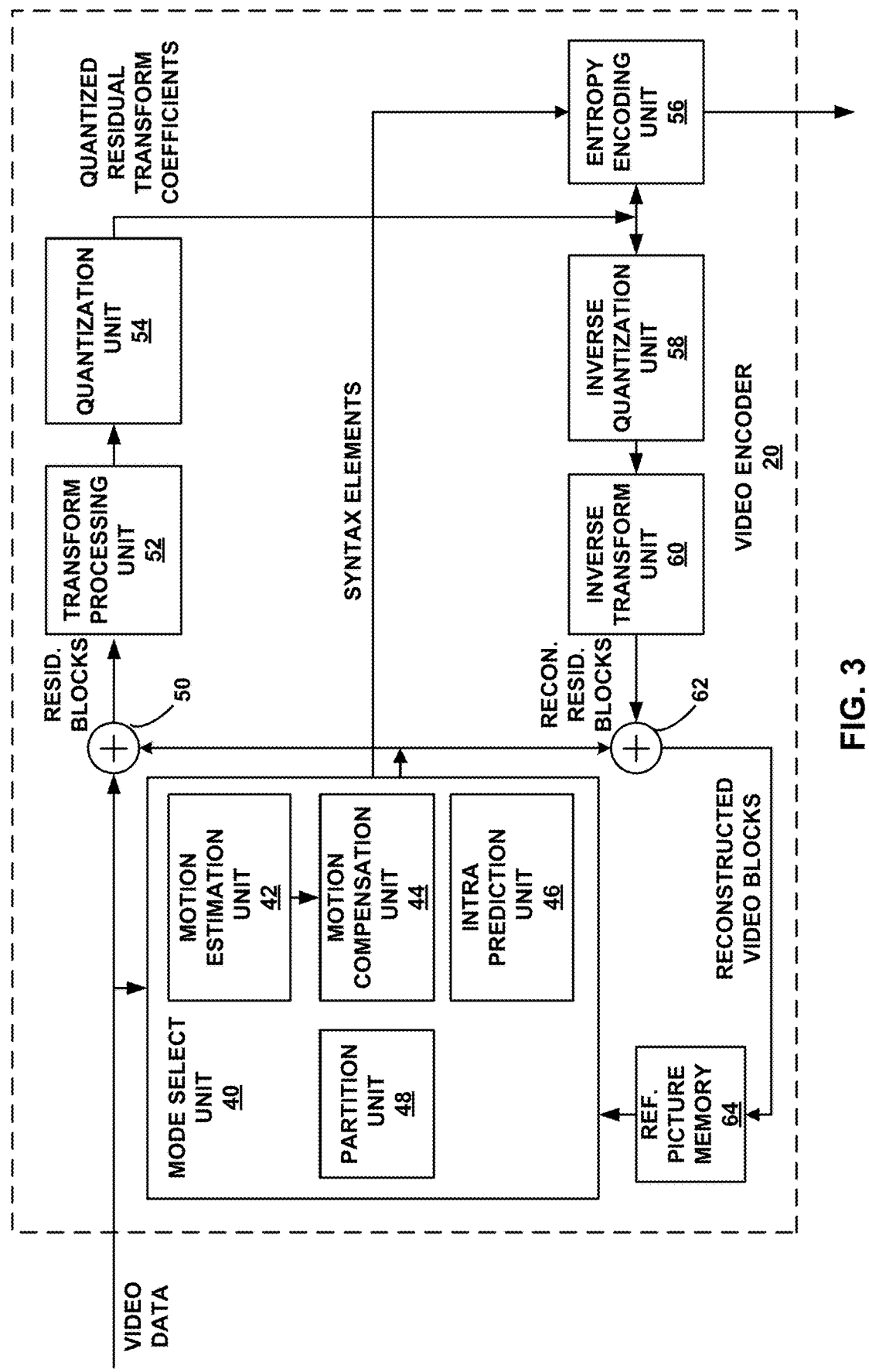
FIG. 3 is a block diagram illustrating an example of a video encoder that may perform techniques for using adaptive group of pictures (GOP) structures of this disclosure.

FIG. 3 is a block diagram illustrating an example video encoder 20 that may implement techniques for performing techniques for using adaptive group of pictures (GOP) structures of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 3, video encoder 20 receives a current video block within a video frame to be encoded. In the example of FIG. 3, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block including transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 4:
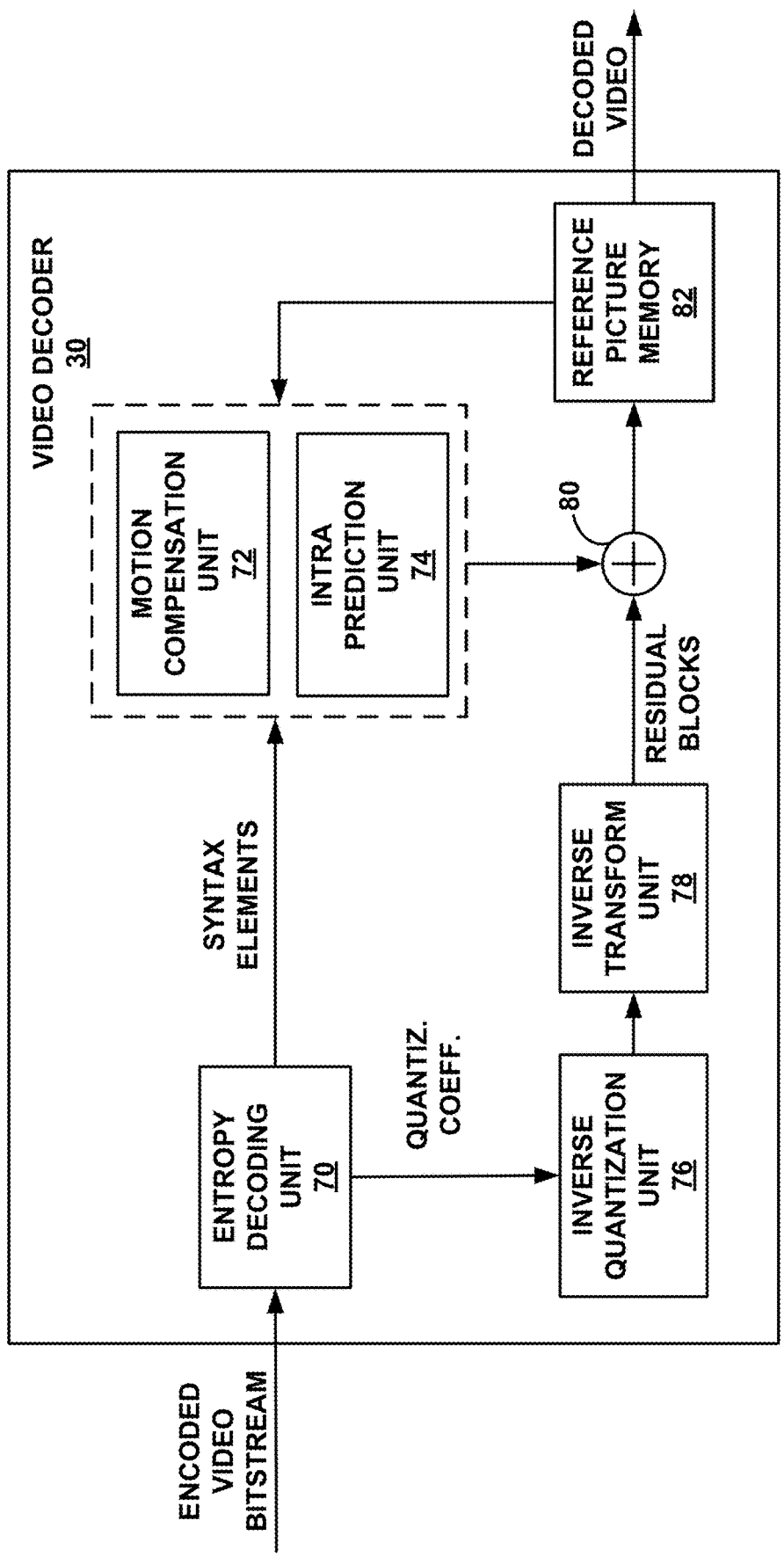
FIG. 4 is a block diagram illustrating an example of a video decoder that may perform techniques for using adaptive group of pictures (GOP) structures of this disclosure.

FIG. 4 is a block diagram illustrating an example video decoder 30 that may perform techniques for using adaptive group of pictures (GOP) structures of this disclosure. In the example of FIG. 4, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 3). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter QPy calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 2.

FIG. 5A is a conceptual diagram illustrating an example set of groups of pictures (GOP) within an intra period (IP)=64. Pictures 100-116 of FIG. 5A include respective POC values of 0, 16, 32, 48, 64, 8, 24, 40, and 56. Arrows in FIG. 5A indicate the prediction direction between a reference picture and a target picture. In particular, solid arrows represent prediction from the past (picture displayed earlier, that is, a reference picture having a display order position earlier than a display order position of a target picture) and dotted arrows represent prediction from the future (picture displayed later, that is, a reference picture having a display order position later than a display order position of a target picture). Note that the reference structure depicts only certain selected frames for ease of illustration.

As illustrated in FIG. 5A, for an intra period of 64 and GOP 16, a conventional GOP16 structure without the proposed scheme codes in the order of picture 100, picture 102, picture 110, . . . picture 104, picture 112, . . . picture 106, picture 114, . . . picture 108, picture 116, then subsequent pictures. That is, the picture coding order in terms of POC values is POC 0→POC 16→POC 8→ . . . →POC 32→POC 24→ . . . →POC 48→POC 40→ . . . →POC 64→ POC 56→ . . . →POC 63. Thus, picture 108 having POC 64 is available as a potential reference picture only for the last 15 pictures, i.e., from picture 116 having POC 56 to a picture (not shown) having POC 63. In other words, any picture before picture 116 having POC 56 in the coding order, e.g., picture 102 having POC 16, picture 104 having POC 32, picture 106 having POC 48, and the like, cannot use POC 64 as a reference picture.

FIG. 5B is a conceptual diagram illustrating an example coding scheme according to the techniques of this disclosure with IP=64. Pictures 120-136 of FIG. 5B include respective POC values of 0, 16, 32, 48, 64, 8, 24, 40, and 56. Once again, arrows in FIG. 5B indicate the prediction direction between a reference picture and a target picture. In particular, solid arrows represent prediction from the past (picture displayed earlier, that is, a reference picture having a display order position earlier than a display order position of a target picture) and dotted arrows represent prediction from the future (picture displayed later, that is, a reference picture having a display order position later than a display order position of a target picture). Note that the reference structure depicts only certain selected frames for better visualization.

In the example proposed scheme of this disclosure depicted in FIG. 5B, the picture coding order is picture 120, picture 128, . . . picture 122, picture 130, . . . picture 124, picture 132, . . . picture 126, picture 134, . . . picture 136, and then subsequent pictures. That is, picture 128 having POC 64 is coded right after picture 120 having POC 0, and thus, the coding order in terms of POC values is changed to POC 0→POC 64→POC 16→POC 8→ . . . →POC 32→POC 24→ . . . →POC 48→POC 40→ . . . →POC 56→ . . . →POC 63. This enables more pictures to use POC 64 as one of the potential reference pictures. Contrasted with the example shown in FIG. 5A, an additional 15 pictures, including picture 122 having POC 16, picture 124 having POC 32, picture 126 having POC 48, and the like, can exploit POC 64 as a reference picture, which may lead to an overall coding performance increase.

An example of how the proposed scheme of this disclosure can be applied in HM16.6-based JEM4.0 codec, which is the reference software for the evaluation of next generation video codec, is discussed below. Since the proposed scheme can be applied to random access configuration, other configurations such as intra or low-delay configurations are omitted. Also, the example adopts one of the possible approaches that are presented in previous sections: exploiting the next I-frame as one of available reference pictures. Discussions with respect to FIGS. 6A, 6B, 7A, and 7B below describe the reference picture structure in random access configuration with GOP size of 16 and the coding order in the case where intra period (IP) is equal to 64 where each 64th picture is an I-frame. Discussions with respect to FIGS. 8 and 9 below describe simulation results on JEM 4.0 software. Note that the techniques of this disclosure are not limited to be used only for JEM4.0. These techniques can easily be applied to other existing video codecs, provided that they support random access configuration, e.g., H.264 or HEVC.

Figure 6A:
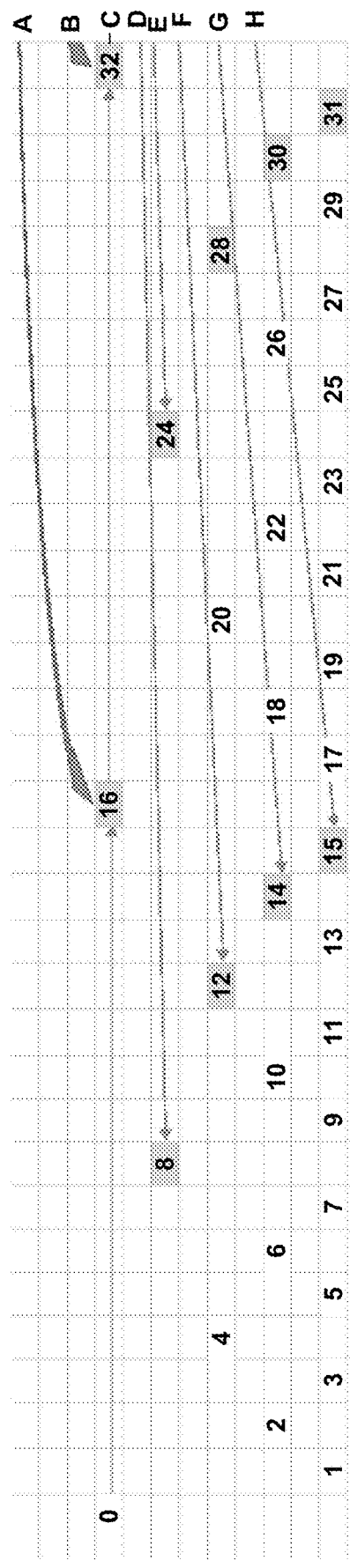
FIGS. 6A and 6B are conceptual diagrams illustrating an example reference picture structure according to the techniques of this disclosure.
Figure 6B:
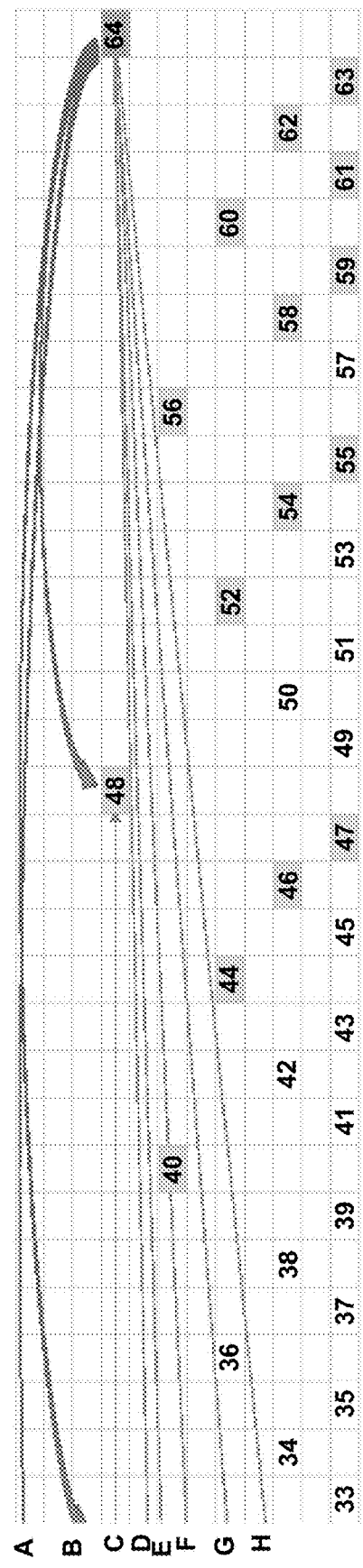

FIGS. 6A and 6B are conceptual diagrams illustrating an example reference picture structure according to the techniques of this disclosure. FIG. 6B represents a continuation of FIG. 6A, where FIG. 6B follows FIG. 6A on the right side of FIG. 6A. For readability, the picture has been split into FIGS. 6A and 6B. The example of FIGS. 6A and 6B depicts a reference picture structure with GOP size of 16. Arrows labeled "A" through "G" on the right side of FIG. 6A and the left side of FIG. 6B represent corresponding arrows between FIGS. 6A and 6B, and indicate potential inter-picture prediction. For example, the arrow labeled "A" indicates that POC 64 can be used to predict POC 16, the arrow labeled "B" indicates that POC 64 can be used to predict POC 32, and so on.

For intra period of 64, POC 0 and POC 64 in FIGS. 6A and 6B are I-frames and the other pictures are B-frames. Note that the highlighted pictures take POC 64 as one of reference pictures. In conventional GOP16 structure, 10 pictures can use POC 64 as one of their reference pictures (highlighted POCs between POC 52 and POC 63, inclusive) but the proposed scheme of this disclosure enables 15 more pictures (in total, 25 pictures) to exploit POC 64 as one of their reference pictures. In the case that I-frame (POC 64 in FIGS. 6A and 6B) has high reconstruction quality due to lower QP and highly efficient intra-prediction algorithms, the accuracy of inter-prediction between POC 64 and highlighted pictures in FIGS. 6A and 6B increases without consuming more bits. Furthermore, higher reconstruction quality of the highlighted pictures propagates throughout a given reference structure toward other neighboring pictures, i.e., higher quality of POC 8 may increase quality of POC 4 when POC 4 refers to POC 8 in inter-prediction, which leads to overall Bjontegaard-Delta (BD)-rate gain.

Figures 7A, 7B:
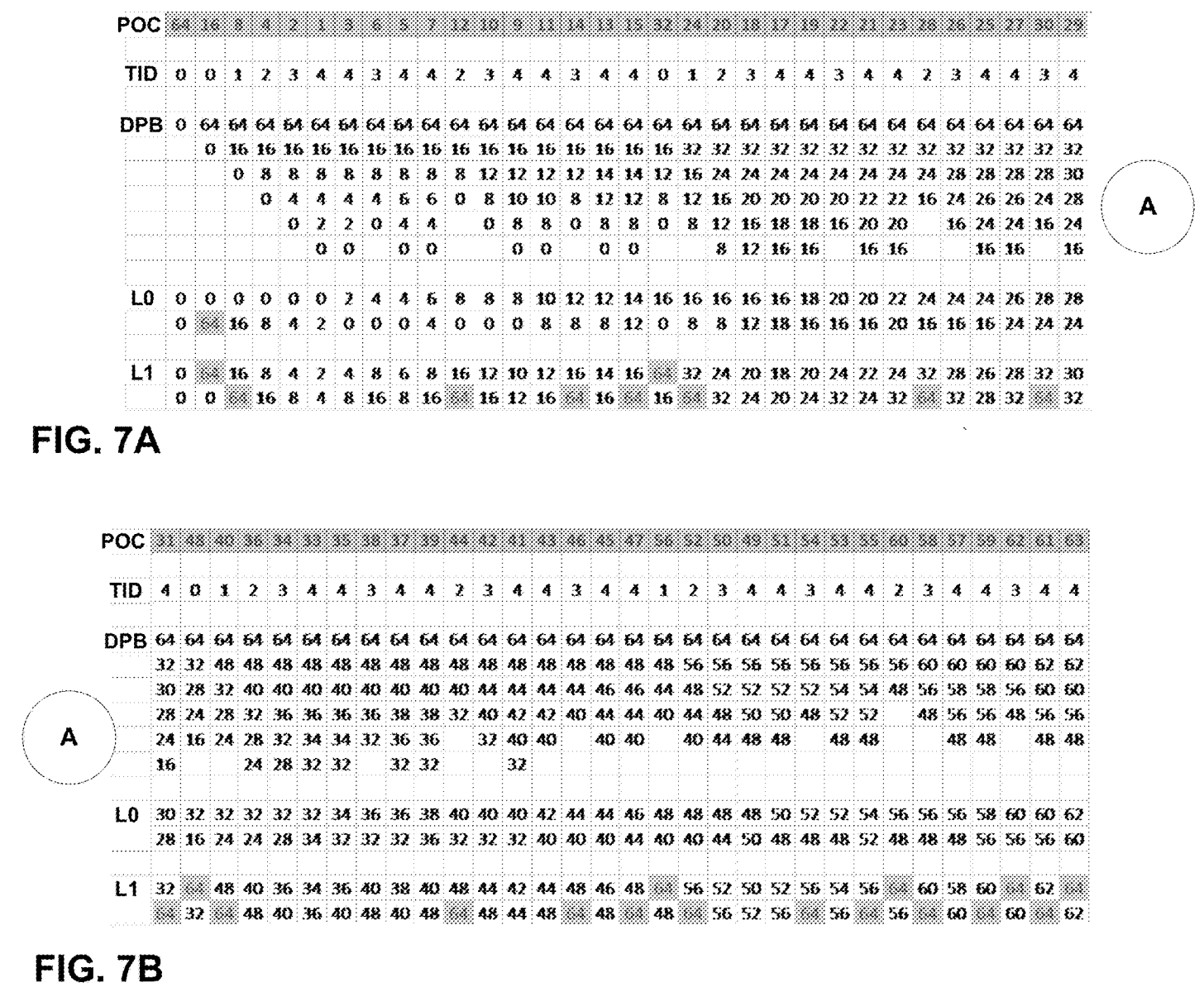

FIGS. 7A and 7B are conceptual diagrams illustrating an example coding of sixty-five pictures in accordance with an example of the techniques of this disclosure. FIG. 7B represents a continuation of FIG. 7A, where FIG. 7B follows FIG. 7A on the right side of FIG. 7A. For readability, the picture has been split into FIGS. 7A and 7B. FIGS. 7A and 7B illustrate detailed operations when encoding the first 65 pictures in an example of the proposed scheme of this disclosure, including pictures from POC 0 to POC 64. More specifically, FIGS. 7A and 7B depicts five categories of information: (1) coding order (2) temporal layer id (TID) (3) pictures stored in picture buffer (DPB) (4) reference pictures from the past (L0 reference pictures) and (5) reference pictures from the future (L1 reference pictures).

Compared to the coding order in conventional random access configuration with GOP 16, the proposed scheme has an identical order except for POC 64. In the conventional configuration, GOP 64 is coded after POC 47; the order would be POC 0→ . . . →POC 47→POC 64→POC 56→POC 52→ . . . →POC 63. Thus, POC 64 would be available as a reference picture only for the last 15 pictures from POC 49 to POC 63. However, according to the proposed scheme in this example, POC 64 is coded right after POC 0. Therefore, POC 64 can be used as one of the reference pictures for up to all 63 pictures, from POC 1 to POC 63, in FIGS. 7A and 7B. Since POC 64 is an I-frame showing a highest reconstruction quality due to lowest QP value and/or intra prediction techniques, taking POC 64 as one of reference pictures, as highlighted in FIGS. 7A and 7B, may increase the reconstruction quality, without consuming more bits. Note that both video encoder 20 and video decoder 30 would follow the same coding order.

FIGS. 7A and 7B illustrate the coded pictures in the buffer that should be kept to code following pictures. For example, when encoding POC 8, the buffer should contain POC 0, POC 16, and POC 64, because those three pictures are used as one of reference pictures for POC 8 and will be used for following pictures. Note that the maximum size of buffer required to support the proposed reference picture structures is 6, which is one larger than that in the conventional random access configuration with GOP size of 16 of, e.g., HEVC. In this example, conventional reference picture set (RPS) signalling in HEVC specification is used, and thus, no change on video decoders conforming to HEVC or JEM would be required.

Table 1 below illustrates performance improvement, in terms of BD-rate, of the techniques of this disclosure over JEM 4.0 with Common Test Conditions (CTC). The proposed scheme achieves 5.27% BD-rate gain over JEM 4.0 with minimal increase in both encoding and decoding complexity. Due to the increase in picture buffer size by one in this example, memory usage for encoder and decoder increases by around 5% and 6% respectively. Table 1 shows the full details of the result for each sequence. Note that the results of other configurations such as intra and low-delay configurations are omitted because the results are not affected by the proposed scheme.

TABLE 1

SIMULATION RESULTS

| Random Access (RA) configuration | Y | U | V | ET | DT |
|---|---|---|---|---|---|
| ClassA1 | −2.76% | −6.58% | −6.70% | 104% | 101% |
| ClassA2 | −6.61% | −11.92% | −11.74% | 106% | 103% |
| ClassB | −6.05% | −12.44% | −12.16% | 103% | 101% |
| ClassG | −4.32% | −6.65% | −6.93% | 99% | 98% |
| ClassH | −7.66% | −10.96% | −12.34% | 99% | 99% |
| ClassC | −5.75% | −10.28% | −9.66% | 105% | 102% |
| ClassD | −4.72% | −9.26% | −9.58% | 104% | 102% |
| Overall | −5.27% | −9.74% | −9.77% | 103% | 101% |

Figure 8:
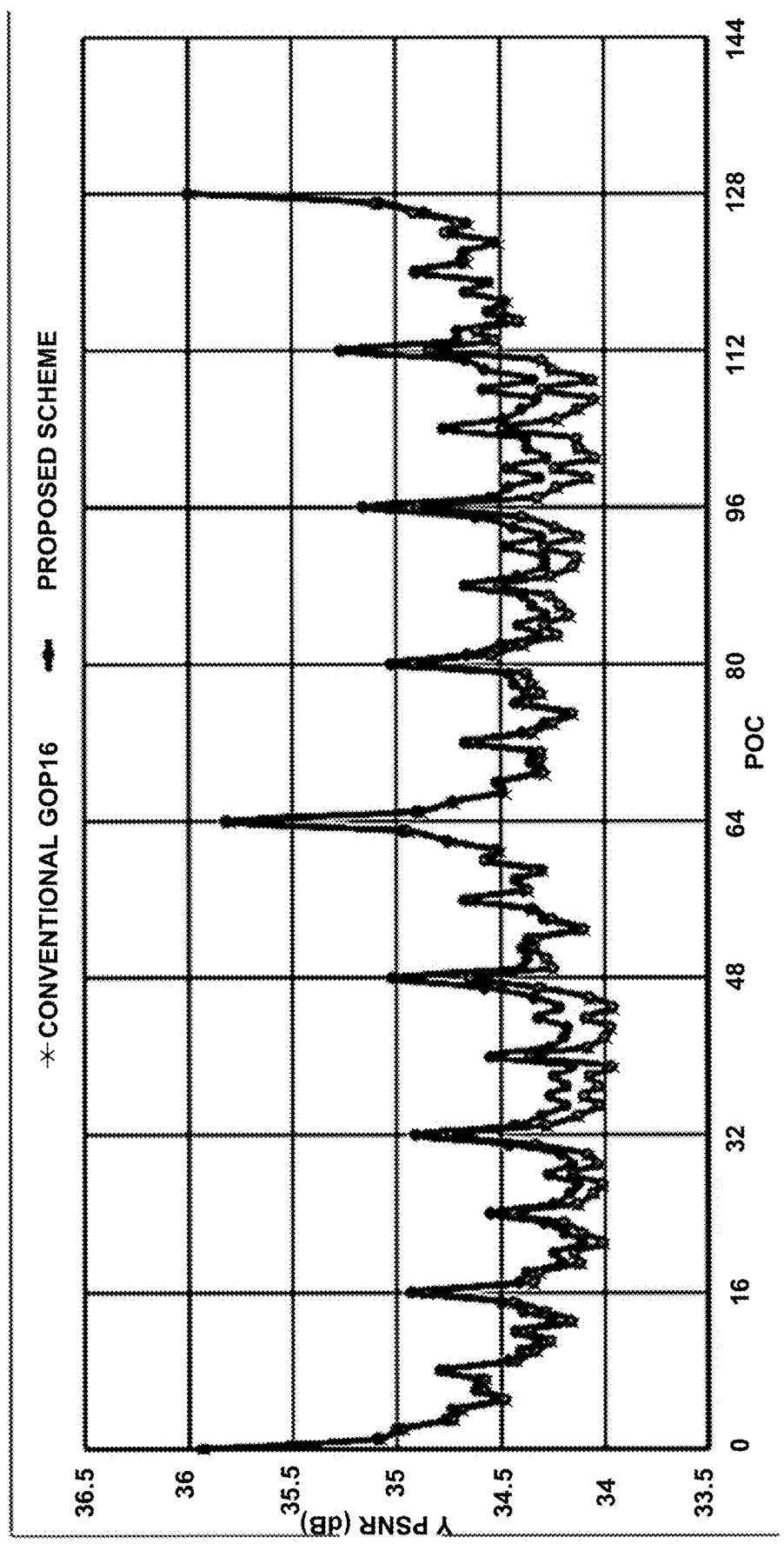
FIGS. 8 and 9 are graphs illustrating data resulting from an analysis of luminance (Y) peak signal to noise ratio (PSNR) and bitrate for each picture of a "DaylightRoad" test sequence for the techniques of this disclosure.
Figure 9:
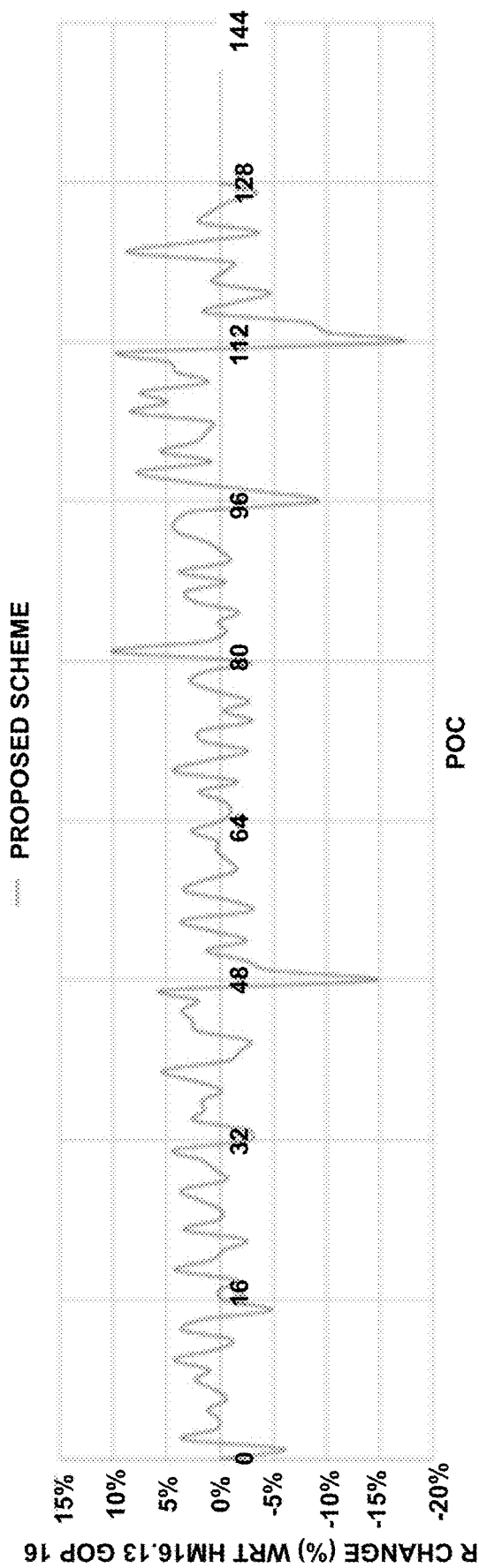

FIGS. 8 and 9 are graphs illustrating data resulting from an analysis of luminance (Y) peak signal to noise ratio (PSNR) and bitrate for each picture of a "DaylightRoad" test sequence for the techniques of this disclosure. In these graphs, a QP of 37 was used. FIG. 8 illustrates the analysis of PSNR trends of Y components of each picture (identified by POC value) between conventional GOP 16 structure and the proposed scheme, where PSNR values of the proposed scheme are higher in most of pictures.

FIG. 9 shows the ratio of bit consumption of the proposed scheme to that of the conventional GOP 16 structure; negative values indicate that the proposed scheme spent less bits than conventional GOP 16. With the proposed scheme, key pictures using POC 64 as one of reference pictures, e.g., POC 32 and POC48, consume significantly less bits than in GOP 16 but preserve higher quality, which leads to better coding efficiency.

Table 2 below shows an overall bit-saving and PSNR increase (−2.16% bit-saving and 0.12 dB PSNR increase for QP37). This leads to 6.55% BD-rate gain, as shown below in Table 3.

TABLE 2

CHANGE OF LUMA PSNR AND BITRATE OF DAYLIGHTROAD SEQUENCE WITH IP = 64 FOR DIFFERENT QP VALUES

| SeqName | QP | Rate (%) | psnrY (dB) |
|---|---|---|---|
| S03_DaylightRoad | 22 | −0.69% | 0.01 |
| | 27 | −2.00% | 0.04 |
| | 32 | −2.31% | 0.08 |
| | 37 | −2.16% | 0.12 |

TABLE 3

SIMULATION RESULTS OF THE PROPOSED
SCHEME FOR EACH SEQUENCE ON JEM 4.0

| SeqClass | SeqName | Y | U | V | EncTime | DecTime |
|---|---|---|---|---|---|---|
| ClassA1 | S01_Tango | −1.62% | −4.31% | −2.84% | 105% | 101% |
|  | S02_Drums | −6.71% | −18.53% | −18.82% | 108% | 102% |
|  | S03_Camp | −2.33% | −1.01% | −3.66% | 101% | 99% |
|  | S04_Toddl | −0.38% | −2.49% | −1.46% | 103% | 101% |
| ClassA2 | S01_CatRo | −5.62% | −8.82% | −7.44% | 111% | 105% |
|  | S02_Traffi | −10.32% | −15.75% | −15.90% | 101% | 100% |
|  | S03_Dayli | −6.55% | −18.55% | −17.40% | 106% | 102% |
|  | S04_Rolle | −3.94% | −4.54% | −6.23% | 106% | 104% |
| ClassB | S01_Kimo | −4.30% | −6.79% | −7.21% | 103% | 100% |
|  | S02_ParkS | −6.54% | −11.47% | −10.43% | 103% | 101% |
|  | S03_Cactu | −7.67% | −14.49% | −12.96% | 104% | 99% |
|  | S04_Baske | −2.05% | −4.73% | −3.63% | 103% | 100% |
|  | S05_BQTe | −9.70% | −24.71% | −26.58% | 104% | 103% |
| ClassG | S01_Food | −5.12% | −9.81% | −10.18% | 98% | 99% |
|  | S02_Park | −1.18% | −1.87% | −2.34% | 99% | 97% |
|  | S03_Build | −9.74% | −11.64% | −11.66% | 101% | 99% |
|  | S04_Cross | −1.23% | −3.27% | −3.55% | 99% | 96% |
| ClassH | S01_Ritua | −3.60% | −6.64% | −6.94% | 98% | 99% |
|  | S02_Time | −11.73% | −15.27% | −17.74% | 99% | 98% |
| ClassC | S01_Bask | −6.42% | −9.35% | −8.35% | 104% | 101% |
|  | S02_BQM | −6.62% | −14.40% | −12.52% | 105% | 101% |
|  | S03_party | −7.48% | −12.39% | −12.60% | 108% | 106% |
|  | S04_Race | −2.46% | −4.97% | −5.15% | 103% | 101% |
| ClassD | S01_Bask | −1.83% | −4.22% | −2.45% | 102% | 102% |
|  | S02_BQS | −7.60% | −17.48% | −17.87% | 107% | 103% |
|  | S03_Blow | −7.16% | −11.47% | −13.25% | 105% | 102% |
|  | S04_Race | −2.30% | −3.88% | −4.73% | 101% | 100% |

Figure 10:
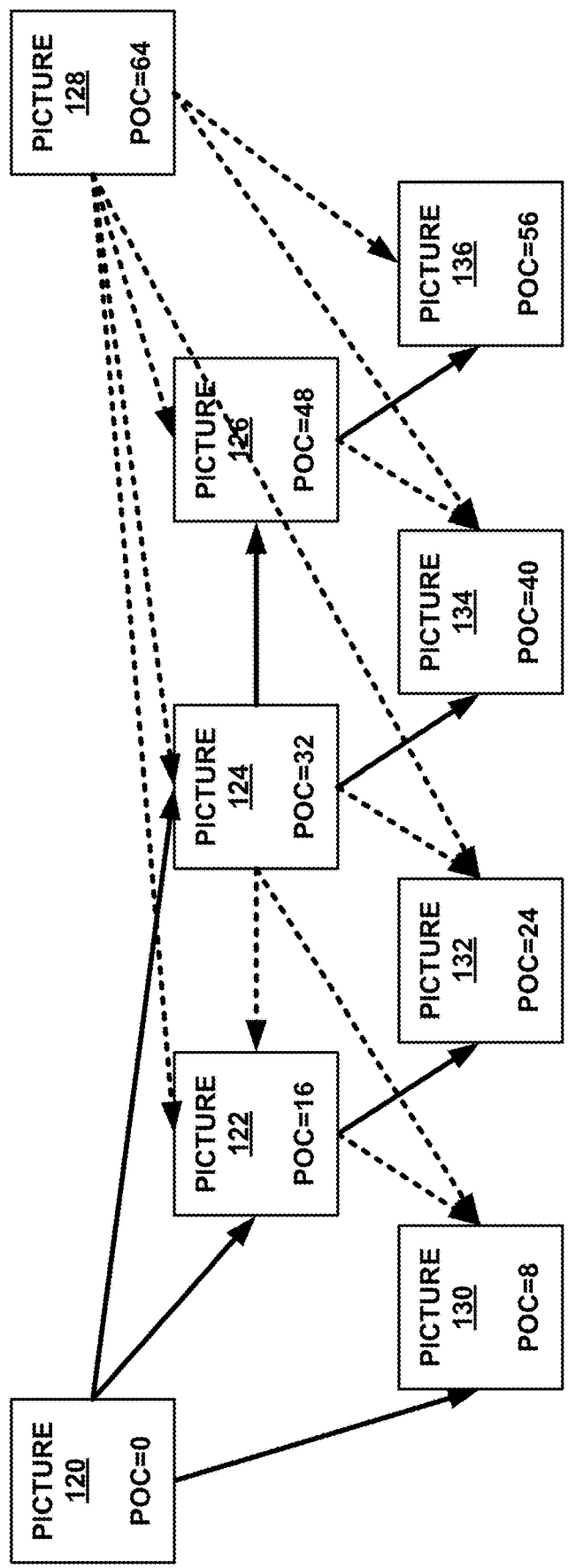
FIG. 10 is a conceptual diagram illustrating an example of a GOP64 with IP=64.

FIG. 10 is a conceptual diagram illustrating an example of a GOP 64 with IP=64. In particular, the GOP of FIG. 10 includes pictures 120-136, having POC values of 0, 16, 32, 48, 64, 8, 24, 40, and 56, respectively. Arrows indicate the prediction direction between reference picture and target picture: a solid arrow represents prediction from a past picture (earlier displayed picture, that is, from a reference picture having an earlier display order position than a target picture) and dotted arrow for prediction from a future picture (later displayed picture, that is, from a reference picture having a later display order position than a target picture). Note that the reference structure is portrayed only for selected frames for better visualization. Certain advantages of the techniques of this disclosure over JEM 4.0 are discussed below with some reference to FIG. 10.

Since conventional GOP 64 of JEM 4.0 also codes POC 64 earlier than other pictures as illustrated in FIG. 10, it might appear similar to the proposed techniques of this disclosure. However, the proposed scheme of this disclosure has three potential advantages over GOP 64 configuration of JEM 4.0.

First, the proposed scheme of this disclosure shows better coding efficiency. Compared to JEM 4.0 with conventional GOP 64 configuration, Table 4 below indicates that the proposed scheme of this disclosure shows higher coding efficiency with reduced complexity both in a video encoder and in a video decoder, e.g., video encoder 20 and video decoder 30. For a fair comparison, the QP value and lambda are identical between GOP 64 and the proposed scheme of this disclosure in this comparison.

Second, due to a constraint in HEVC specification that intra period (IP) should be multiples of GOP size, a GOP 64 configuration cannot be applied to sequences with IP=32, 48, or 96. This is one reason why only a subset of sequences is presented in Table 4. However, since the proposed scheme follows a conventional GOP 16 structure, except for first encoding a future frame and using it as one of a plurality of reference frames to code the pictures within an intra period (e.g., between a previous IRAP and a future IRAP), the proposed scheme is not limited by the restriction.

Lastly, the amount of memory required to store coded pictures with GOP 64 of JEM 4.0 is 5~6% larger than that for the proposed scheme of this disclosure. More specifically, GOP 64 is required to store up to 7 coded pictures in a well-implemented encoder and decoder according to JEM 4.0, but in the proposed scheme of this disclosure, only up to 6 coded pictures need be stored.

TABLE 4

PERFORMANCE COMPARISON BETWEEN THE PROPOSED
SCHEME AND CONVENTIONAL GOP64 STRUCTURE ON
JEM 4.0; NEGATIVE NUMBERS INDICATE THAT THE
PROPOSED SCHEME SHOWS BD-RATE GAIN OVER GOP 64

| SeqClass | SeqName | Y | U | V | EncTime | DecTime |
|---|---|---|---|---|---|---|
| ClassA1 | S01_Tango | −0.30% | −1.00% | −0.24% | 99% | 101% |
|  | S04_Toddl | −0.06% | −1.15% | −0.16% | 97% | 99% |
| ClassA2 | S01_CatRo | −0.02% | −1.03% | −0.58% | 98% | 102% |
| ClassB | S03_Daylig | −0.12% | 0.75% | 0.70% | 96% | 101% |
|  | S04_Roller | −1.77% | −2.86% | −2.68% | 100% | 103% |
|  | S05_BQTe | −0.15% | 1.50% | 1.01% | 97% | 99% |

TABLE 4-continued

PERFORMANCE COMPARISON BETWEEN THE PROPOSED
SCHEME AND CONVENTIONAL GOP64 STRUCTURE ON
JEM 4.0; NEGATIVE NUMBERS INDICATE THAT THE
PROPOSED SCHEME SHOWS BD-RATE GAIN OVER GOP 64

| SeqClass | SeqName | Y | U | V | EncTime | DecTime |
|---|---|---|---|---|---|---|
| ClassG | S04_Cross | −0.20% | −0.45% | −0.35% | 87% | 90% |
| ClassH | S01_Ritua | −0.03% | 0.16% | −0.07% | 93% | 97% |
|  | Overall | −0.33% | −0.51% | −0.30% | 96% | 99% |

The proposed scheme of this disclosure was tested by modifying the reference software of both JEM 7.0 and HM 16.16. The simulation results show similar coding gains as described above, and as illustrated in Tables 5 and 6 below. JEM 7.0 is available from vceg.hhi.fraunhofer.de/svn/svn_HMJEMSoftware/tags/HM-16.6-JEM-7.0/, and HM 16.16 is available from hevc.hhi.fraunhofer.de/svn/svn_HEVCSoftware/tags/HM-16.16.

TABLE 5

SIMULATION RESULTS OF THE
PROPOSED SCHEME ON JEM 7.0

Over HM-16.6-JEM-7.0 (parallel, gcc6.2)

|  | Y | U | V | EncT | DecT |
|---|---|---|---|---|---|
| Class A1 | −2.80% | −7.28% | −7.05% | 109% | 101% |
| Class A2 | −6.76% | −12.66% | −12.49% | 109% | 100% |
| Class B | −6.12% | −12.89% | −12.64% | 109% | 101% |
| Class C | −5.79% | −10.40% | −9.87% | 105% | 101% |
| Class D | −4.79% | −9.56% | −9.82% | 104% | 100% |
| Class E |  |  |  |  |  |
| Overall (Ref) | −5.29% | −10.67% | −10.48% | 107% | 101% |

TABLE 6

SIMULATION RESULTS OF THE
PROPOSED SCHEME ON HM 16.16

Over HM-16.16 (sequential, gcc6.2)

|  | Y | U | V | EncT | DecT |
|---|---|---|---|---|---|
| Class A1 | −2.29% | −5.26% | −5.23% | 113% | 100% |
| Class A2 | −5.34% | −8.20% | −8.56% | 112% | 97% |
| Class B | −5.40% | −9.25% | −9.18% | 109% | 100% |
| Class C | −5.11% | −7.45% | −7.18% | 109% | 100% |
| Class D | −4.12% | −7.11% | −7.15% | 105% | 99% |
| Class E |  |  |  |  |  |
| Overall (Ref) | −4.50% | −7.54% | −7.54% | 109% | 99% |

Figure 11:
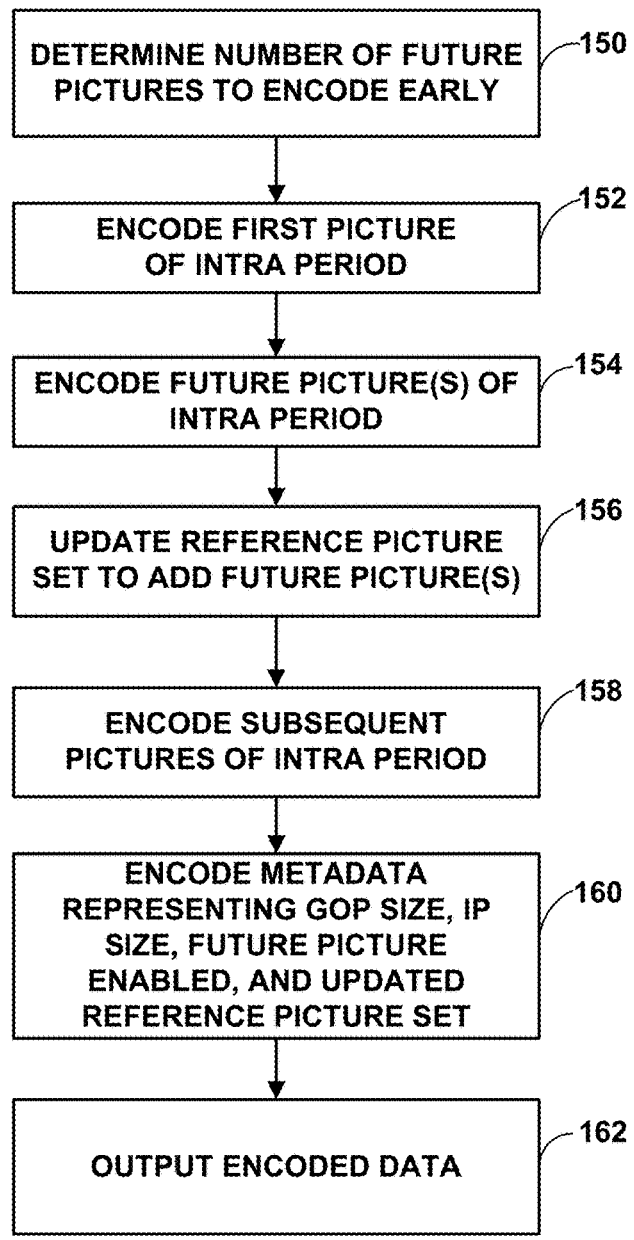
FIG. 11 is a flowchart illustrating an example method for encoding video data in accordance with the techniques of this disclosure.

FIG. 11 is a flowchart illustrating an example method for encoding video data in accordance with the techniques of this disclosure. The method of FIG. 11 is explained with respect to the example of video encoder 20 of FIGS. 2 and 3, although it should be understood that in other examples, other devices may be configured to perform this or a similar method.

Initially, video encoder 20 may determine a number of future pictures of an intra period to encode early (150). For example, video encoder 20 may select, zero, one, or more than one future picture to encode early. To determine this number, video encoder 20 may perform a training procedure on an input video sequence and/or determine characteristics of the input video sequence. The characteristics may be, for example, an average motion vector size, an intra-prediction ratio, and/or a skip ratio. In some examples, video encoder 20 may determine the number and relative positions of future pictures to be the same for each intra period of a full input video sequence, such that multiple intra periods have the same number and relative positions of early encoded future pictures.

Video encoder 20 may then encode an ordinal first picture of an intra period (152). That is, video encoder 20 may encode, for example, an ordinal first picture of an ordinal first group of pictures (GOP) of the intra period, where the intra period includes a plurality of GOPs including the first GOP. Video encoder 20 may then encode the determined number of future pictures of the intra period (154). For example, assuming video encoder 20 determines to encode one future picture, video encoder 20 may (with respect to FIG. 5B) first encode picture 120, then encode picture 128. In this example, a future picture is considered to be a picture having a display order position later than each of the pictures of the ordinal first GOP of the intra period.

Video encoder 20 may then update a reference picture set to add the future pictures to the reference picture set (156). For example, video encoder 20 may add each of the determined future pictures to reference picture sets of one or more subsequently encoded pictures of the intra period. Video encoder 20 may then encode the subsequent pictures of the intra period (158) using the respective updated reference picture sets that include the future pictures. For example, video encoder 20 may use a reference picture list construction procedure that selects from among the available reference pictures in the reference picture set, such that one or more constructed reference picture lists include one or more future pictures. In this manner, encoding the subsequent pictures of the intra period may include predicting at least a portion of one of the subsequent pictures (e.g., a picture of the ordinal first GOP or of a subsequent GOP) using the future picture as a reference picture in inter-prediction.

Video encoder 20 may further encode metadata representing a GOP size, an IP size, that future picture coding is enabled, and how to update a reference picture set (160). For example, video encoder 20 may encode any or all of this metadata in a parameter set such as a video parameter set (VPS), a sequence parameter set (SPS), or a picture parameter set (PPS), and/or a slice header. The metadata may indicate positions of the future pictures, e.g., using differences between POC values of the future pictures and a reference POC value, such as the POC value of the ordinal first picture of the intra period. The data indicating that future picture coding is enabled may be a flag of a parameter set, such as a VPS or SPS.

Ultimately, video encoder 20 may output the encoded data (162), including the encoded ordinal first picture, the encoded future picture(s), the encoded subsequent pictures, and the encoded metadata.

In this manner, the method of FIG. 11 represents an example of a method including encoding a future picture of video data having a first display order position, the future picture being included in an intra period (IP) of the video data, the IP including a plurality of groups of pictures (GOPs), and after encoding the future picture, encoding a picture of an ordinal first GOP of the plurality of GOPs using the future picture as a reference picture, each picture of the ordinal first GOP having display order positions earlier than the first display order position.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
    encoding a future intra random access point (IRAP) picture of video data having a first display order position, the future IRAP picture being included in an intra period (IP) of the video data, the IP comprising a plurality of groups of pictures (GOPs) and a plurality of IRAP pictures including the future IRAP picture; and
    after encoding the future IRAP picture, encoding a picture of an ordinal first GOP of the plurality of GOPs using the future IRAP picture as a reference picture, each picture of the ordinal first GOP having display order positions earlier than the first display order position, the future IRAP picture being beyond a GOP boundary of the ordinal first GOP.

2. The method of claim 1, wherein the first display order position comprises an ordinal last display order position of the IP.

3. The method of claim 1, further comprising:
    encoding data representing a GOP size for the plurality of GOPs in a sequence of pictures, the IP comprising the sequence of pictures;
    encoding data indicating that the future IRAP picture is to be decoded before other pictures in the sequence of pictures, the first display order position being at an end of the sequence of pictures;
    updating a reference picture set for a second picture of the sequence of pictures to include the future IRAP picture;
    encoding data indicating the updated reference picture set for the second picture; and
    encoding the second picture using the updated reference picture set, comprising predicting at least a portion of the second picture from the future IRAP picture.

4. The method of claim 3, wherein encoding the data representing the GOP size comprises encoding a sequence parameter set (SPS) including the data representing the GOP size.

5. The method of claim 3, further comprising updating a delta picture order count (POC) value of the second picture to refer to the future IRAP picture.

6. The method of claim 3, wherein encoding the data indicating the updated reference picture set comprises encoding a slice header of a slice of the second picture, the slice header including the data indicating the updated reference picture set.

7. The method of claim 1, further comprising:
encoding a first flag of a sequence parameter set (SPS), the first flag indicating that encoding of the future IRAP picture before other pictures of the IP is enabled; and
encoding data of the SPS specifying a size of the IP in response to encoding of the future IRAP picture before other pictures of the IP being enabled.

8. The method of claim 1, further comprising encoding data indicating a subset of future pictures for the IP, the subset of future pictures comprising the future IRAP picture.

9. A device for encoding video data, the device comprising:
a memory configured to store video data; and
a processing system comprising one or more processors implemented in circuitry, the processing system being configured to:
encode a future intra random access point (IRAP) picture of video data having a first display order position, the future IRAP picture being included in an intra period (IP) of the video data, the IP comprising a plurality of groups of pictures (GOPs) and a plurality of IRAP pictures including the future IRAP picture; and
after the future IRAP picture has been encoded, encode a picture of an ordinal first GOP of the plurality of GOPs using the future IRAP picture as a reference picture, each picture of the ordinal first GOP having display order positions earlier than the first display order position, the future IRAP picture being beyond a GOP boundary of the ordinal first GOP.

10. The device of claim 9, wherein the first display order position comprises an ordinal last display order position of the IP.

11. The device of claim 9, wherein the processing system is further configured to:
encode data representing a GOP size for the plurality of GOPs in a sequence of pictures, the IP comprising the sequence of pictures;
encode data indicating that the future IRAP picture is to be decoded before other pictures in the sequence of pictures, the first display order position being at an end of the sequence of pictures;
update a reference picture set for a second picture of the sequence of pictures to include the future IRAP picture;
encode data indicating the updated reference picture set for the second picture; and
encode the second picture using the updated reference picture set, wherein the processing system is configured to predict at least a portion of the second picture from the future IRAP picture.

12. The device of claim 11, wherein to encode the data representing the GOP size, the processing system is configured to encode a sequence parameter set (SPS) including the data representing the GOP size.

13. The device of claim 11, wherein the processing system further configured to update a delta picture order count (POC) value of the second picture to refer to the future IRAP picture.

14. The device of claim 11, wherein to encode the data indicating the updated reference picture set, the processing system is configured to encode a slice header of a slice of the second picture, the slice header including the data indicating the updated reference picture set.

15. The device of claim 9, wherein the processing system is further configured to:
encode a first flag of a sequence parameter set (SPS), the first flag indicating that the future IRAP picture can be encoded before other pictures of the IP; and
encode data of the SPS specifying a size of the IP in response to encoding of the future IRAP picture before other pictures of the IP being enabled.

16. The device of claim 9, wherein the processing system is further configured to encode data indicating a subset of future pictures for the IP, the subset of future pictures comprising the future IRAP picture.

17. The device of claim 9, wherein the device comprises a wireless communication device.

18. A non-transitory computer-readable storage medium having stored thereon instructions that, when executed, cause a processor to:
encode a future intra random access point (IRAP) picture of video data having a first display order position, the future IRAP picture being included in an intra period (IP) of the video data, the IP comprising a plurality of groups of pictures (GOPs) and a plurality of IRAP pictures including the future IRAP picture; and
after encoding the future IRAP picture, encode a picture of an ordinal first GOP of the plurality of GOPs using the future IRAP picture as a reference picture, each picture of the ordinal first GOP having display order positions earlier than the first display order position, the future IRAP picture being beyond a GOP boundary of the ordinal first GOP.

19. The non-transitory computer-readable storage medium of claim 18, wherein the first display order position comprises an ordinal last display order position of the IP.

20. The non-transitory computer-readable storage medium of claim 18, further comprising instructions that cause the processor to:
encode data representing a GOP size for the plurality of GOPs in a sequence of pictures, the IP comprising the sequence of pictures;
encode data indicating that the future IRAP picture is to be decoded before other pictures in the sequence of pictures, the first display order position being at an end of the sequence of pictures;
update a reference picture set for a second picture of the sequence of pictures to include the future IRAP picture;
encode data indicating the updated reference picture set for the second picture; and
encode the second picture using the updated reference picture set, including instructions that cause the processor to predict at least a portion of the second picture from the future IRAP picture.

21. The non-transitory computer-readable storage medium of claim 18, further comprising instructions that cause the processor to:
encode a first flag of a sequence parameter set (SPS), the first flag indicating that encoding of the future IRAP picture before other pictures of the IP is enabled; and
encode data of the SPS specifying a size of the IP in response to encoding of the future IRAP picture before other pictures of the IP being enabled.

22. The non-transitory computer-readable storage medium of claim 18, further comprising instructions that cause the processor to encode data indicating a subset of future pictures for the IP, the subset of future pictures comprising the future IRAP picture.

\* \* \* \* \*